(12) United States Patent
Sekii

(10) Patent No.: US 11,025,106 B2
(45) Date of Patent: Jun. 1, 2021

(54) STATOR WINDING FOR MOTOR

(71) Applicant: Nidec Corporation, Kyoto (JP)

(72) Inventor: Yoichi Sekii, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 225 days.

(21) Appl. No.: 16/107,100

(22) Filed: Aug. 21, 2018

(65) Prior Publication Data

US 2019/0097475 A1  Mar. 28, 2019

(30) Foreign Application Priority Data

Sep. 26, 2017 (JP) .............................. JP2017-184776

(51) Int. Cl.

| | | |
|---|---|---|
| *H02K 1/18* | (2006.01) | |
| *H02K 1/14* | (2006.01) | |
| *H02K 3/52* | (2006.01) | |
| *H02K 1/27* | (2006.01) | |
| *H02K 21/22* | (2006.01) | |
| *H02K 3/28* | (2006.01) | |
| *H02K 3/20* | (2006.01) | |
| *H02K 3/50* | (2006.01) | |
| *H02K 7/14* | (2006.01) | |

(52) U.S. Cl.
CPC ................. *H02K 1/18* (2013.01); *H02K 1/14* (2013.01); *H02K 1/146* (2013.01); *H02K 1/2786* (2013.01); *H02K 3/28* (2013.01); *H02K 3/522* (2013.01); *H02K 21/22* (2013.01); *H02K 3/20* (2013.01); *H02K 3/50* (2013.01); *H02K 7/14* (2013.01)

(58) Field of Classification Search
CPC .......... H02K 1/18; H02K 1/146; H02K 21/22; H02K 3/28; H02K 1/14; H02K 3/522; H02K 1/2786; H02K 7/14; H02K 3/20; H02K 3/50
USPC .................................................. 310/179–208
See application file for complete search history.

(56) References Cited

U.S. PATENT DOCUMENTS

| | | | | |
|---|---|---|---|---|
| 2,790,099 A | * | 4/1957 | Nyyssonen ............ | H02K 17/12 310/202 |
| 4,833,355 A | * | 5/1989 | Kawashima ........... | H02K 21/22 310/198 |
| 6,583,529 B2 | * | 6/2003 | Suzuki ..................... | H02K 3/28 310/199 |

(Continued)

FOREIGN PATENT DOCUMENTS

| | | |
|---|---|---|
| JP | 2002-186203 A | 6/2002 |
| JP | 2008-278694 A | 11/2008 |

*Primary Examiner* — Ahmed Elnakib
(74) *Attorney, Agent, or Firm* — Keating & Bennett

(57) ABSTRACT

A conducting wire includes an incoming portion, coil portions, an outgoing portion leading out of an armature, and circumferentially extending portions. The circumferentially extending portions include an alternately arranged portion extending alternately on first and second axial sides of circumferentially adjacent ones of teeth, and a passage line portion extending on a same axial side of circumferentially adjacent ones of the teeth. One to two rounds of the circumferentially extending portions extend along a core back. The passage line portion extends on a same axial side over two of the teeth which have at least one of the incoming portion and the outgoing portion located circumferentially therebetween, and is radially outside of at least one of the incoming portion and the outgoing portion.

7 Claims, 8 Drawing Sheets

(56) References Cited

U.S. PATENT DOCUMENTS

2004/0178690 A1\* 9/2004 Morimatsu ............. H02K 3/28
                                                                                            310/180

\* cited by examiner

STATOR WINDING FOR MOTOR

CROSS REFERENCE TO RELATED APPLICATIONS

This application claims the benefit of priority to Japanese Patent Application No. 2017-184776 filed on Sep. 26, 2017. The entire contents of this application are hereby incorporated herein by reference.

BACKGROUND OF THE INVENTION

1. Field of the Invention

The present invention relates to a motor.

2. Description of the Related Art

A known motor is described in, for example, JP-A 2002-186203. The motor described in JP-A 2002-186203 includes an armature including a core and coils. The core is defined by laminated thin metal plates, and includes an annular yoke portion and substantially T-shaped magnetic pole portions arranged to project radially inward from the yoke portion, and arranged at regular intervals. Each coil is wound around a separate one of the magnetic pole portions. In addition, the core of the armature is provided with projecting hooks on which passage lines joining the coils wound around the magnetic pole portions to one another are hooked. Each projecting hook is arranged to project outward in a thickness direction of the core from a position between adjacent ones of the magnetic pole portions of the laminated thin metal plates. Hooking each passage line on one of the projecting hooks contributes to preventing the passage line from overlapping with any coil. Thus, the coils can be securely wound.

In the motor described in JP-A 2002-186203, each passage line can never be an obstacle, but the need to define the projecting hooks by bending the thin metal plate(s) involves a cumbersome operation. In addition, because portions of the thin metal plate(s) are deformed, resulting in a deterioration in magnetic characteristics of the armature, efficiency of the motor may be reduced.

SUMMARY OF THE INVENTION

Accordingly, preferred embodiments of the present invention provide a motor which allows easy wiring and is able to limit a reduction in motor efficiency without the need for a special member or special working.

A motor according to a preferred embodiment of the present invention is a three-phase motor including a rotor rotatable about a central axis extending in a vertical direction, and a stator radially opposite to the rotor. The stator includes an armature and a base to hold the armature. The armature includes an annular core back extending in an axial direction; 6S teeth extending radially from the core back, and arranged in a circumferential direction (where S is a positive integer); and conducting wires for three phases. Each of the conducting wires for three phases includes an incoming portion leading from a first axial side into the armature; a plurality of coil portions each of which is wound around a corresponding one of the teeth; an outgoing portion leading from a second axial side to the first axial side to be drawn out of the armature; and circumferentially extending portions each of which extend in the circumferential direction along the core back to join the incoming portion to one of the coil portions, to join one of the coil portions to another one of the coil portions, or to join one of the coil portions to the outgoing portion. The circumferentially extending portions include an alternately arranged portion extending alternately on the first and second axial sides of circumferentially adjacent ones of the teeth; and a passage line portion extending on the same axial side of circumferentially adjacent ones of the teeth. One to two rounds of the circumferentially extending portions extend along the core back. The passage line portion extends on the same axial side over two of the teeth which have at least one of the incoming portion and the outgoing portion located circumferentially therebetween, and is located radially outside of at least one of the incoming portion and the outgoing portion.

The motor according to the above preferred embodiment of the present invention allows easy wiring and is able to limit a reduction in motor efficiency without the need for a special member or working.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 2:
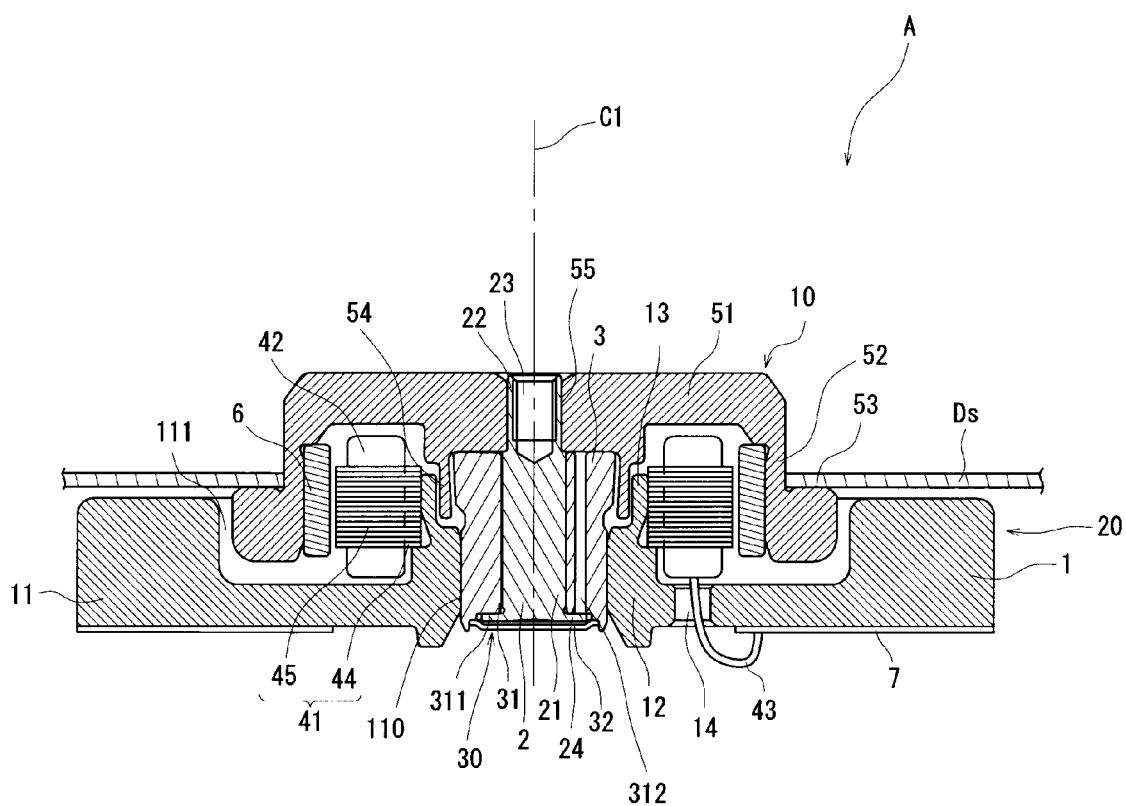
FIG. 2 is a sectional view of the motor illustrated in FIG. 1 taken along a plane including a central axis.

Hereinafter, preferred embodiments of the present invention will be described in detail with reference to the accompanying drawings. It is assumed herein that a direction parallel to a central axis C1 of a motor is referred to by the term "axial direction", "axial", or "axially", that directions perpendicular to the central axis C1 are each referred to by the term "radial direction", "radial", or "radially", and that a direction along a circular arc centered on the central axis C1 is referred to by the term "circumferential direction", "circumferential", or "circumferentially". It is also assumed herein that a motor A illustrated in FIG. 2 is used as a reference to define an upper side and a lower side in a vertical direction along the central axis C1, and the shape of each member or portion and relative positions of different members or portions will be described based on the above assumption. It should be noted, however, that the above definition of the vertical direction and the upper and lower sides is made simply for the sake of convenience in description, and is not meant to restrict relative positions or directions of different members or portions of the motor when in use.

Figure 1:
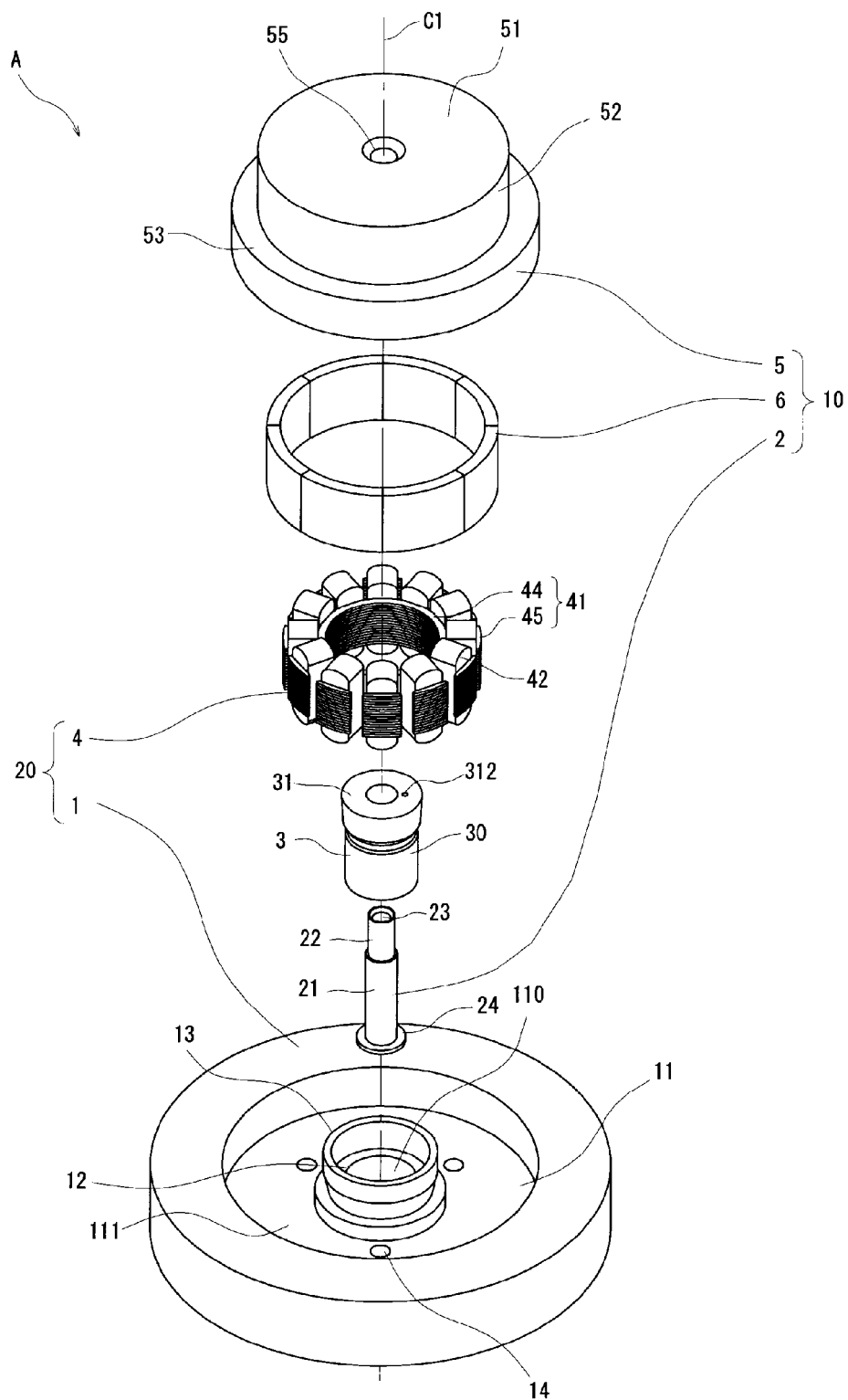
FIG. 1 is an exploded perspective view of a motor according to a preferred embodiment of the present invention.

Hereinafter, a preferred embodiment of the present invention will be described with reference to the accompanying drawings. FIG. 1 is an exploded perspective view of the motor A according to a first preferred embodiment of the present invention. FIG. 2 is a sectional view of the motor A illustrated in FIG. 1 taken along a plane including the central axis C1. The motor A according to the present preferred embodiment is a so-called spindle motor arranged to rotate a disk-shaped recording disk Ds, such as, for example, a hard disk. In the motor A, a rotor 10 is supported through a bearing 30 to be rotatable with respect to a stator 20. That is, the rotor 10 is supported to be rotatable about the central axis C1 with respect to the stator 20.

Referring to FIGS. 1 and 2, the motor A according to the present preferred embodiment includes a base 1, a shaft 2, a sleeve 3, an armature 4, a hub 5, a rotor magnet 6, and a circuit board 7. The rotor 10 includes the shaft 2, the hub 5, and the rotor magnet 6. The stator 20 includes the base 1 and the armature 4. The bearing 30 includes the sleeve 3.

In the rotor 10, the shaft 2 is fixed to a central portion of the hub 5. In addition, the rotor magnet 6 is arranged inside of the hub 5, and both the shaft 2 and the rotor magnet 6 are centered on the central axis C1.

Referring to FIGS. 1 and 2, the shaft 2 is columnar. The shaft 2 includes a first shaft portion 21, a second shaft portion 22, a screw hole 23, and a flange portion 24. The shaft 2 is made of a metal. The shaft 2 is arranged to extend along the central axis C1. The shaft 2 is arranged to extend along the central axis extending in the vertical direction, and is arranged to rotate about the central axis C1.

The first shaft portion 21 is arranged to extend in an axial direction. The second shaft portion 22 is cylindrical, and is arranged axially above the first shaft portion 21. The second shaft portion 22 is arranged to have a diameter smaller than that of the first shaft portion 21. The first and second shaft portions 21 and 22 are made of the same material, and are defined integrally with each other. The screw hole 23 is recessed downward from an axially upper surface of the shaft 2. An inner surface of the screw hole 23 includes a female screw. In addition, the flange portion 24 is arranged to extend radially outward at an axially lower end portion of the shaft 2. The flange portion 24 is in the shape of a disk.

The shaft 2 is fixed to the central portion of the hub 5. The hub 5 and the shaft 2 are arranged to rotate together. Referring to FIGS. 1 and 2, the hub 5 includes a hub top plate portion 51, a hub tubular portion 52, a disk flange 53, a labyrinth projecting portion 54, and a shaft fixing hole 55. Note that, while the shaft 2 of the motor A according to the present preferred embodiment is rotatable, this is not essential to the present invention. A motor according to another preferred embodiment of the present invention may include a fixed shaft 2.

The hub top plate portion 51 is arranged to extend radially. The hub top plate portion 51 is circular when viewed in the axial direction. The hub tubular portion 52 is arranged to extend axially downward from a radially outer edge of the hub top plate portion 51. The hub tubular portion 52 is cylindrical. The disk flange 53 is arranged to extend radially outward from an axially lower end portion of the hub tubular portion 52. The disk flange 53 is circular when viewed in the axial direction. The hub top plate portion 51, the hub tubular portion 52, and the disk flange 53 are made of the same material, and are molded integrally with each other.

An axially upper surface of the disk flange 53 is a flat surface perpendicular to the central axis C1. The disk Ds is arranged to be in contact with the axially upper surface of the disk flange 53. The disk Ds is then fixed to the hub 5. Thus, the disk Ds is fixed so as to be perpendicular to the central axis C1, i.e., a rotation axis. Then, rotation of the hub 5 causes the disk Ds to rotate. Note that, while the motor A according to the present preferred embodiment includes only one disk Ds, this is not essential to the present invention. In a motor according to another preferred embodiment of the present invention, a plurality of disks Ds may be fixed such that the disks Ds are spaced from one another in a direction parallel to the central axis C1. Even in this case, all the disks Ds are fixed so as to be perpendicular to the central axis C1.

The shaft fixing hole 55 is a through hole defined in a center of the hub top plate portion 51 when viewed in the axial direction, and arranged to pass through the hub top plate portion 51 in the axial direction. The second shaft portion 22 of the shaft 2 is inserted into and fixed in the shaft fixing hole 55. The second shaft portion 22 is fixed in the shaft fixing hole 55 through, for example, press fitting.

The labyrinth projecting portion 54 is arranged to project downward from a lower surface of the hub top plate portion 51. The labyrinth projecting portion 54 is tubular, and the labyrinth projecting portion 54 is arranged to have an inside diameter greater than a diameter of the shaft fixing hole 55. Referring to FIG. 2, the labyrinth projecting portion 54 is arranged radially outward of a portion of an axially upper end portion of a sleeve body 31, which will be described below, of the bearing 30. The labyrinth projecting portion 54 and the hub top plate portion 51 are made of the same material, and are molded integrally with each other.

Referring to FIG. 2, the rotor magnet 6 is arranged on an inner surface of the hub tubular portion 52. The rotor magnet 6 is cylindrical, and is arranged to extend along the central axis C1. A radially inner surface of the rotor magnet 6 is arranged radially opposite to a radially outer surface of the armature 4 with a gap therebetween. The rotor magnet 6 includes a plurality of pairs of magnetic poles, each pair including a north pole and a south pole. The rotor magnet 6 may be defined by a cylindrical magnetic body including north and south poles arranged to alternate with each other in a circumferential direction, or alternatively, a plurality of magnets arranged in the circumferential direction may be used as the rotor magnet 6. The rotor magnet 6 is fixed inside of the hub tubular portion 52 through, for example, press fitting. Note that the method for fixing the rotor magnet 6 is not limited to the press fitting, and that adhesion, welding, a mechanical fixing method, and so on may be adopted to fix the rotor magnet 6. In the motor A according to the present preferred embodiment, the rotor magnet 6 includes eight magnetic poles.

The stator 20 includes the base 1 and the armature 4. The armature 4 is held by the base 1 such that the radially outer surface of the armature 4 is arranged radially opposite to the radially inner surface of the rotor magnet 6 of the rotor 10 with the gap therebetween. That is, the stator 20 includes the armature 4 and the base 1, which is arranged to hold the armature 4, and is arranged radially opposite to the rotor 10.

Referring to FIGS. 1 and 2, the base 1 is a bottom portion arranged to cover an axially lower end of the motor A. The base 1 includes a base plate 11, a sleeve attachment portion 12, a stator holding portion 13, and lead wire insert holes 14. The base plate 11 is circular, that is, in the shape of a disk, when viewed in the axial direction. A base recessed portion 111 recessed axially downward is defined in an axially upper surface of the base plate 11. A section of the base recessed portion 111 which is perpendicular to the central axis C1 is circular, and an axially lower end portion of the hub 5 is rotatably accommodated in the base recessed portion 111. That is, the base recessed portion 111 is cylindrical, and the axially lower end portion of the hub 5 is arranged to rotate about the central axis C1 inside of the base recessed portion 111.

Note that, although the base plate 11 of the base 1 is in the shape of a disk in the present preferred embodiment, the base plate 11 may not necessarily be in the shape of a disk. For example, the base 1 may alternatively be in the shape of a polygon, such as, for example, a quadrilateral or a hexagon, or in the shape of an ellipse or the like, when viewed in the axial direction. A wide variety of shapes may be adopted for the base 1 in accordance with a device to which the motor A is to be attached. Also note that the base recessed portion 111 may not necessarily be cylindrical, but may alternatively be in any other desirable shape that allows the axially lower end portion of the hub 5 to be rotatably accommodated therein.

A through hole 110, which is arranged to pass through the base plate 11 in the axial direction, is defined in a center of the base plate 11. The sleeve attachment portion 12 is cylindrical, and is arranged to project axially upward from a periphery of the through hole 110. The sleeve attachment portion 12 and the base plate 11 may be made of the same material and be defined integrally with each other, or alternatively, the sleeve attachment portion 12 may be a member separate from the base plate 11 and fixed to the base plate 11. Notice that, in the motor A, the through hole 110 is in a center of the base recessed portion 111.

The sleeve body 31, which will be described below, of the bearing 30 is arranged to be in contact with, and is fixed to, an inner surface of the sleeve attachment portion 12. The stator holding portion 13 is a tubular portion arranged to project axially upward from an axially upper surface of the sleeve attachment portion 12. The stator holding portion 13 is arranged to be in contact with an inner surface of a stator core 41, which will be described below, of the armature 4 to hold the armature 4. As illustrated in FIG. 2, an axially lower side of the armature 4 may be arranged to be in contact with a radially outer surface of the sleeve attachment portion 12. That is, at least a portion of the armature 4 is held by the stator holding portion 13.

Each lead wire insert hole 14 is arranged at the base recessed portion 111. The lead wire insert hole 14 is a through hole arranged to pass through the base plate 11 in the axial direction. Lead wires 43, which are connected to coil portions 42, which will be described below, of the armature 4, are inserted through the lead wire insert holes 14. In addition, the circuit board 7 is attached to an axially lower surface of the base 1. Each lead wire 43 is inserted into the corresponding lead wire insert hole 14 through an axially upper opening thereof, and is drawn out of the corresponding lead wire insert hole 14 through an axially lower opening thereof. The lead wire 43 drawn out is then connected to the circuit board 7. Note that, although the number of lead wire insert holes 14 is three in the present preferred embodiment, only one lead wire insert hole may be provided in another preferred embodiment of the present invention.

The armature 4 is held by the stator holding portion 13 of the base 1. The armature 4 includes the stator core 41, the coil portions 42, and the lead wires 43. That is, the armature 4 includes the stator core 41.

The stator core 41 is defined by laminated silicon steel sheets. Referring to FIG. 1, the stator core 41 includes an annular core back 44 and teeth 45. That is, the armature 4 includes the annular core back 44 and the teeth 45. Referring to FIG. 2, the stator core 41 is defined by plate-shaped members placed one upon another in the axial direction. That is, the stator core 41 is a laminated body. Note, however, that this is not essential to the present invention.

The core back 44 is annular, and is arranged to extend in the axial direction. An inner surface of the core back 44 is arranged to be in contact with an outer surface of the stator holding portion 13, so that the core back 44, hence the armature 4, is held by the stator holding portion 13. The stator holding portion 13 and the core back 44 are fixed to each other through press fitting. Note that other fixing methods than the press fitting, such as adhesion, deposition, welding, and the like, may be widely adopted to securely fix the stator holding portion 13 and the core back 44 to each other.

Each tooth 45 is arranged to project radially outward from a radially outer surface of the core back 44. That is, the teeth 45 are arranged to project radially outward from the core back 44. The stator core 41 includes twelve of the teeth 45. The teeth 45 are arranged at regular intervals in the circumferential direction. That is, the teeth 45 are arranged to extend radially from the core back 44, and are arranged in the circumferential direction. The armature 4 has twelve slots. The motor A according to the present preferred embodiment includes the rotor magnet 6 with eight magnetic poles, and the armature 4 with twelve slots. That is, the motor A is an outer-rotor motor having eight poles and twelve slots.

Each tooth 45 of the stator core 41 has one of the coil portions 42 defined by a conducting wire wound therearound. The armature 4 includes twelve of the coil portions 42.

The lead wires 43 are arranged to electrically connect each of the coil portions 42 to a circuit (not shown) mounted on the circuit board 7. Referring to FIG. 2, each lead wire 43 is drawn out downwardly from an axially lower side of the armature 4. The lead wire 43 is then passed through the corresponding lead wire insert hole 14 of the base 1 to be drawn out downwardly of the base 1, and is electrically connected to a wiring pattern (not shown) on the circuit board 7. Each lead wire 43 is connected to the wiring pattern through soldering. Note, however, that each lead wire 43 may be connected to the wiring pattern using a connection member, such as, for example, a connector, instead of through the soldering. The armature 4 will be described in detail below.

Next, the bearing 30, which is arranged to support the rotor 10 such that the rotor 10 is rotatable with respect to the stator 20, will now be described below. The bearing 30 is a fluid dynamic bearing using a fluid. The bearing 30 is arranged to rotatably support the shaft 2. The bearing 30 includes the sleeve body 31 and a seal cap 32. Each of the sleeve body 31 and the seal cap 32 is made of, for example, stainless steel or the like. The sleeve body 31 and the seal cap 32 together define the sleeve 3.

The sleeve body 31 is cylindrical, and is centered on the central axis C1. The sleeve body 31 has, at a lower portion thereof, a shoulder portion 311 recessed upward. The flange portion 24 of the shaft 2 is accommodated inside of the shoulder portion 311. In addition, the seal cap 32 is attached to the shoulder portion 311 to cover a lower side of the flange portion 24. The seal cap 32 is fixed by a fixing method using an adhesive or the like.

The sleeve body 31 includes a circulation hole 312 arranged to pass therethrough in the axial direction at a position radially outward of the central axis C1. The circulation hole 312 is in communication with a gap between the seal cap 32 and the shoulder portion 311 at the lower portion of the sleeve body 31.

Minute gaps are defined between an inner circumferential surface of the sleeve body 31 and an outer circumferential surface of the shaft 2, between the sleeve body 31 and an upper surface and an outer circumferential surface of the flange portion 24, and between an upper surface of the seal cap 32 and a lower surface of the flange portion 24. A lubricating oil as the fluid is continuously arranged in these minute gaps. Thus, the bearing 30 of the motor A is defined by the sleeve body 31, the seal cap 32, the shaft 2, and the lubricating oil.

The flange portion 24 and a portion of the shaft 2 which is radially opposite to an inner surface of the sleeve body 31 include grooves defined therein. When the shaft 2 rotates, these grooves produce dynamic pressures in the lubricating oil. The dynamic pressures cause the lubricating oil to circulate through the gap between the inner surface of the sleeve body 31 and the outer surface of the shaft 2 and a gap between an axially upper end surface of the sleeve body 31 and the axially lower surface of the hub top plate portion 51 of the hub 5. As a result, the shaft is supported through the lubricating oil while being out of contact with the sleeve body 31, allowing the rotor 10 to rotate with respect to the stator 20 with high precision and reduced noise.

That is, the bearing 30 includes a so-called radial bearing which includes the lubricating oil circulating through the gap between the outer surface of the shaft 2 and the sleeve body 31, and which is arranged to support rotation of the shaft 2. In addition, the bearing 30 includes a so-called thrust bearing which includes the lubricating oil circulating through the gap between the sleeve body 31 and the axially lower surface of the hub top plate portion 51, and which is arranged to support the shaft 2 in the axial direction.

The motor A according to the present preferred embodiment has the above-described structure. Next, important portions of the motor A according to the present preferred embodiment will now be described below with reference to the accompanying drawings.

Figure 3:
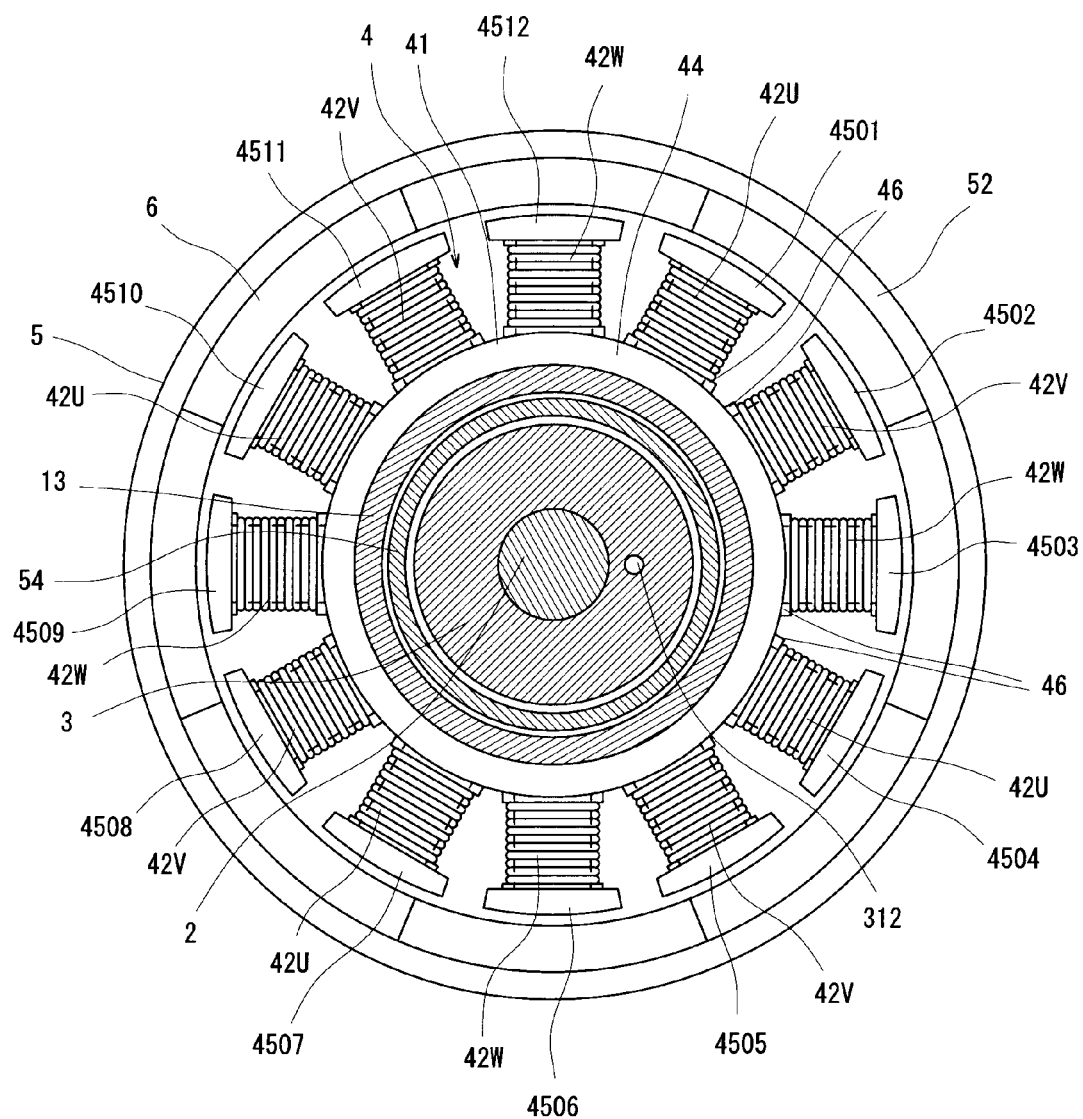
FIG. 3 is a plan view of an armature included in the motor according to a preferred embodiment of the present invention.

FIG. 3 is a sectional view of the motor A illustrated in FIG. 1 taken along a plane perpendicular to the central axis C1. Referring to FIG. 3, the stator core 41 includes the twelve teeth 45, which are arranged to project radially outward from an outer circumferential surface of the annular core back 44. In addition, the twelve teeth 45 are arranged at regular intervals in the circumferential direction. It is assumed in the following description that the tooth 45 at 1 o'clock position when a dial of a clock is superimposed on the stator core 41 illustrated in FIG. 3 is designated as a first tooth 4501. Then, the other teeth 45 are designated in a clockwise order as a second tooth 4502, a third tooth 4503, and so on, and finally a twelfth tooth 4512, which is adjacent to the first tooth 4501 on the counterclockwise side. When the teeth 45 need to be differentiated from one another, the designations "first to twelfth teeth 4501 to 4512" will be used.

Referring to FIG. 3, the stator core 41 of the armature 4 is defined by laminated thin metal plates, i.e., the laminated silicon steel sheets, as mentioned above. The stator core 41 is provided with an insulator 46 arranged to cover at least a portion of each of the teeth 45 around which the coil portion 42 is wound. The insulator 46 is made of, for example, a resin having an insulating property. Each coil portion 42 is defined by a conducting wire wound around the corresponding tooth 45 covered with the insulator 46.

That is, the insulator 46 is an insulating body arranged to provide isolation between the tooth 45 and the coil portion 42. Note that, although the insulator 46, which is an insulating body arranged to provide isolation between the tooth 45 and the coil portion 42, is used in the armature 4, the insulator 46 may be omitted in the case where a conducting wire with an insulating coating (e.g., an enamel coating) is wound around each of the teeth 45. Note that the insulator 46 can be used not only as an insulating member but also to make it easier to wind the conducting wire around the tooth 45. Therefore, the insulator 46 may be provided even in the case where the conducting wire with the insulating coating is wound around each of the teeth 45.

Three types (hereinafter referred to as three phases) of electric currents, which differ in timing (phase) of supply, are supplied to the motor A. That is, the motor A is a three-phase motor. The electric currents of the three phases are defined as a U phase current, a V phase current, and a W phase current, respectively. Then, one of the three phase currents is supplied to each of the twelve coil portions 42 of the armature 4. That is, the twelve coil portions 42 include U-phase coil portions 42U, to which the U phase current is supplied, V-phase coil portions 42V, to which the V phase current is supplied, and W-phase coil portions 42W, to which the W phase current is supplied. Then, one of the three phase currents is supplied to each coil portion 42 to energize the coil portion 42. Attractive and repulsive forces generated between the energized coil portions 42 and the rotor magnet 6 produce a torque to rotate the rotor 10.

In the armature 4, the coil portions 42 for the U phase, the coil portions 42 for the V phase, and the coil portions 42 for the W phase are arranged to be equal in number in order to allow the rotor 10 to smoothly rotate. That is, the armature 4 includes four of the U-phase coil portions 42U, four of the V-phase coil portions 42V, and four of the W-phase coil portions 42W.

In addition, the U-phase coil portions 42U, the V-phase coil portions 42V, and the W-phase coil portions 42W are arranged in order around the twelve teeth 45. For example, in the armature 4, the U-phase coil portions 42U are arranged around the first tooth 4501, the fourth tooth 4504, the seventh tooth 4507, and the tenth tooth 4510. In addition, the V-phase coil portions 42V are arranged around the second tooth 4502, the fifth tooth 4505, the eighth tooth 4508, and the eleventh tooth 4511. In addition, the W-phase coil portions 42W are arranged around the third tooth 4503, the sixth tooth 4506, the ninth tooth 4509, and the twelfth tooth 4512. Further, the U-phase coil portions 42U are arranged at regular intervals in the circumferential direction. The V-phase coil portions 42V are arranged at regular intervals in the circumferential direction. The W-phase coil portions 42W are arranged at regular intervals in the circumferential direction.

Figure 4:
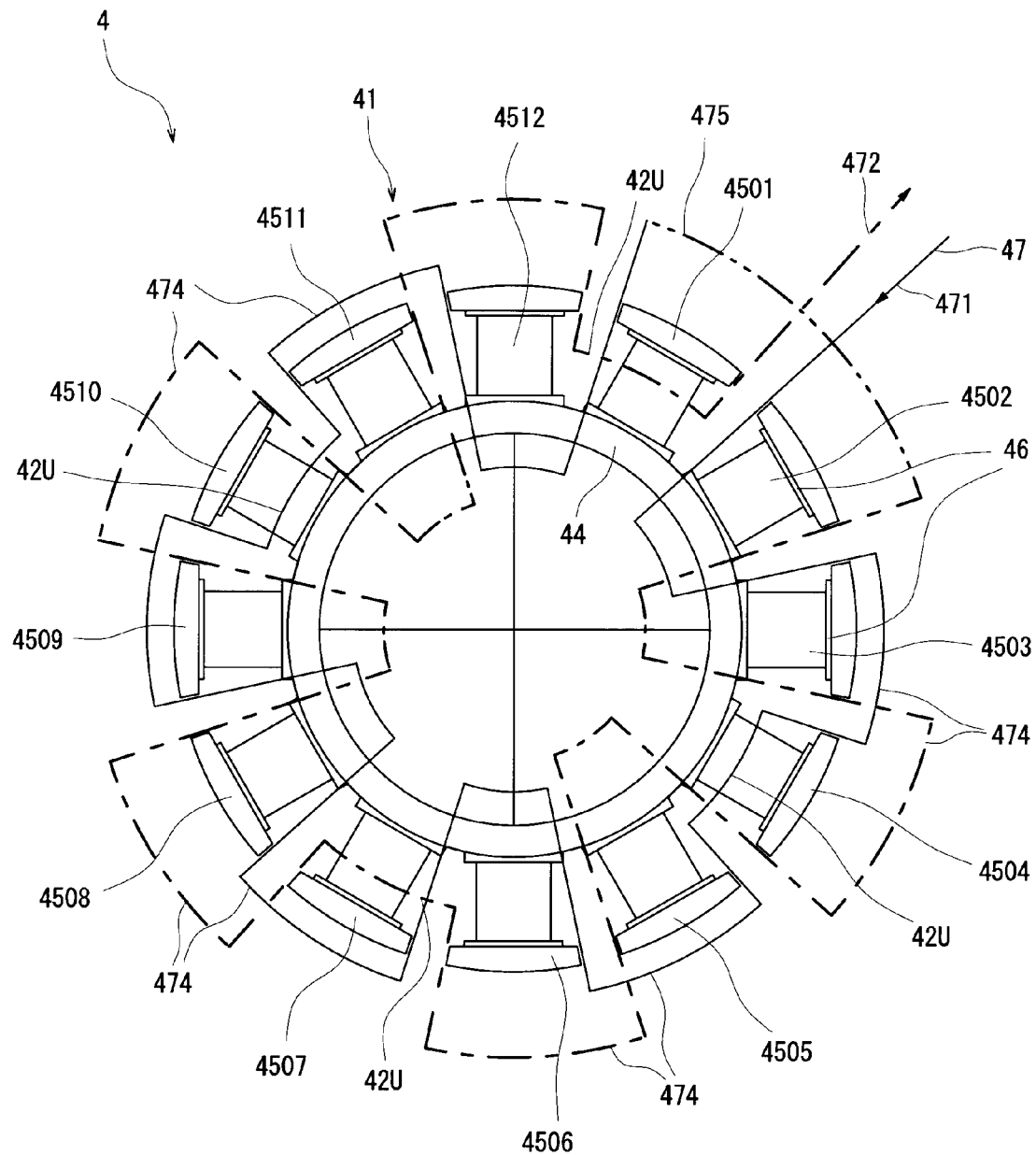
FIG. 4 is a plan view illustrating how a conducting wire is arranged around a stator core when defining U-phase coil portions.
Figure 5:
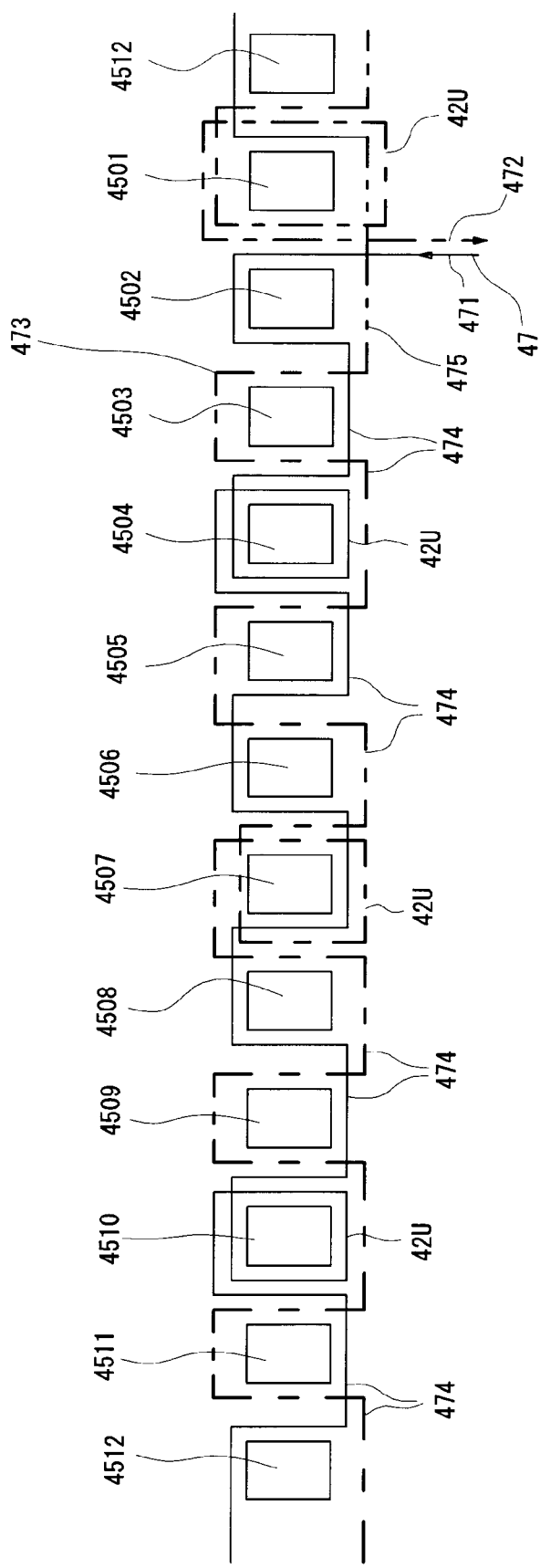
FIG. 5 is a wiring diagram illustrating how the conducting wire including the U-phase coil portions is arranged.

Next, a manner of arranging the conducting wires wound around the armature 4 will now be described below. FIG. 4 is a plan view illustrating how the conducting wire is arranged around the stator core when defining the U-phase coil portions. FIG. 5 is a wiring diagram illustrating how the conducting wire including the U-phase coil portions is arranged. FIG. 5 illustrates a circumferential development of the stator core as viewed from radially outside. In FIG. 4, portions of the conducting wire 47 which are arranged on the axially lower side lie radially outside of the teeth 45, while portions of the conducting wire 47 which are arranged on the axially upper side lie radially inside of the teeth 45. Each U-phase coil portion 42U is indicated by a line crossing the corresponding tooth 45.

The clockwise direction of the armature 4 illustrated in FIG. 4 corresponds to a leftward direction in FIG. 5. In addition, the vertical direction in FIG. 5 corresponds to the direction along the central axis C1. Notice that, in FIG. 5, the twelfth tooth 4512 is depicted to the right of the first tooth 4501 for the sake of convenience in explanation. That is, in FIG. 5, the twelfth tooth 4512 is depicted at both left and right ends. This shows that the twelfth tooth 4512 lies circumferentially adjacent to both the eleventh tooth 4511 and the first tooth 4501. Note that, in each of FIGS. 4 and 5, a first round of circumferentially extending portions 473 is represented by a solid line. In addition, a second round of circumferentially extending portions 473 is represented by a dot-dashed line thicker than the solid line for the first round. Further, a passage line portion 475 is represented by a chain double-dashed line. In addition, in FIG. 5, each U-phase coil portion 42U is indicated by a line making one round around the corresponding tooth 45.

The U-phase coil portions 42U, the V-phase coil portions 42V, and the W-phase coil portions 42W of the armature 4 are made by separate conducting wires 47 being wound around the predetermined teeth 45 and arranged along the core back 44. Each group of the U-phase coil portions 42U, the V-phase coil portions 42V, and the W-phase coil portions 42W is defined by a separate one of the conducting wires 47 being arranged around the stator core 41 and along the circumferential direction, and being wound around the aforementioned predetermined teeth 45.

It is assumed in the following description that the conducting wire which defines the U-phase coil portions 42U is referred to as a U-phase conducting wire, the conducting wire which defines the V-phase coil portions 42V is referred to as a V-phase conducting wire, and the conducting wire which defines the W-phase coil portions 42W is referred to as a W-phase conducting wire. That is, the armature 4 includes conducting wires for three phases. The U-phase conducting wire, the V-phase conducting wire, and the W-phase conducting wire are arranged in the same manner except that the U-phase coil portions 42U, the V-phase coil portions 42V, and the W-phase coil portions 42W are defined around different teeth. Accordingly, in the following description, the U-phase conducting wire, which defines the U-phase coil portions 42U, is described as the conducting wire 47.

The conducting wire 47 is arranged on the stator core 41, the core back 44, and the teeth 45. In other words, the conducting wire 47 is arranged in the armature 4. The conducting wire 47 arranged in the armature 4 includes an incoming portion 471, an outgoing portion 472, the circumferentially extending portions 473, and the U-phase coil portions 42U. That is, each of the conducting wires 47 for three phases includes the incoming portion 471, which leads from a first axial side into the armature 4, a plurality of coil portions 42 each of which is wound around a corresponding one of the teeth 45, the outgoing portion 472, which leads from a second axial side to the first axial side to be drawn out of the armature 4, and the circumferentially extending portions 473, each of which is arranged to extend in the circumferential direction along the core back 44 to join the incoming portion 471 to one of the coil portions 42, to join one of the coil portions 42 to another one of the coil portions 42, or to join one of the coil portions 42 to the outgoing portion 472.

The incoming portion 471 is an arrangement start terminal of the conducting wire 47 arranged in the armature 4. Meanwhile, the outgoing portion 472 is an arrangement end terminal of the conducting wire 47 arranged in the armature 4. Each of the incoming portion 471 and the outgoing portion 472 is joined to one of the lead wires 43. Accordingly, an end portion of each of the incoming portion 471 and the outgoing portion 472 extends to an axial side of the armature 4 on which the circuit board 7 is arranged.

For example, in the armature 4, the incoming portion 471 is arranged to extend upward from the axially lower side between adjacent ones of the teeth 45. The outgoing portion 472 is arranged to extend downward from the axially upper side between adjacent ones of the teeth 45. Note that each of the incoming portion 471 and the outgoing portion 472 may alternatively be arranged to serve as one of the lead wires 43. In other words, each of the incoming portion 471 and the outgoing portion 472 may alternatively be directly connected to the circuit board 7.

The U-phase coil portions 42U, the V-phase coil portions 42V, and the W-phase coil portions 42W may be connected in a star configuration. In this case, the outgoing portions 472 of the conducting wires 47 for the three phases are connected to each other to define a neutral point. The outgoing portions 472 of the conducting wires 47 for the three phases may be connected to each other on an opposite axial side of the stator core 41 with respect to the circuit board 7. In this case, each of the outgoing portions 472 may not be arranged to extend toward the axially lower side of the armature 4.

As illustrated in FIGS. 4 and 5, the incoming portion 471 is arranged to extend upward from the axially lower side between the first tooth 4501 and the second tooth 4502. Meanwhile, the outgoing portion 472 is arranged to extend downward from the axially upper side between the first tooth 4501 and the second tooth 4502.

The circumferentially extending portions 473 are portions of the conducting wire 47 which are arranged to extend in the circumferential direction along the core back 44. The arrangement of the circumferentially extending portions 473 is performed in the clockwise direction in FIG. 4. The circumferentially extending portions 473 include alternately arranged portions 474 and the passage line portion 475. That is, the circumferentially extending portions 473 include the alternately arranged portions 474, each of which is arranged to extend alternately on the first and second axial sides of circumferentially adjacent ones of the teeth 45, and the passage line portion 475, which is arranged to extend on the same axial side of circumferentially adjacent ones of the teeth 45.

In the motor A, the U-phase coil portion 42U is arranged around every third tooth 45. The conducting wire 47 of each of the U-phase coil portions 42U is wound in the same direction when the armature 4 is viewed from radially outside. Referring to FIG. 5, in the armature 4, the conducting wire 47 is wound in a counterclockwise direction when the armature 4 is viewed from radially outside.

Next, a specific manner of arranging the conducting wire 47 will now be described below. Referring to FIGS. 4 and 5, the incoming portion 471 is arranged in a slot between the first tooth 4501 and the second tooth 4502. Then, one of the alternately arranged portions 474 is arranged to extend on the axially upper side of the second tooth 4502, and is thereafter arranged to extend axially downward through a slot between the second tooth 4502 and the third tooth 4503. Then, the alternately arranged portion 474 is arranged to extend axially upward through a slot between the third tooth 4503 and the fourth tooth 4504. Then, the conducting wire 47 is wound around the fourth tooth 4504 to define one of the U-phase coil portions 42U. After the conducting wire 47 defines the U-phase coil portion 42U, a portion of the conducting wire 47 as one of the alternately arranged portions 474 is arranged to extend on the axially lower side of the fifth tooth 4505, and is thereafter arranged to extend axially upward through a slot between the fifth tooth 4505 and the sixth tooth 4506.

Thus, the alternately arranged portion 474 is arranged to extend alternately on the axially upper and lower sides of adjacent ones of the teeth 45. In the armature 4, the U-phase coil portion 42U is defined around every third tooth 45 from the fourth tooth 4504, around which the U-phase coil portion 42U is defined. Meanwhile, the alternately arranged portion 474 is wound in the same direction at each even-numbered tooth 45. Then, the alternately arranged portion 474 is wound in a reverse direction at the seventh tooth 4507, which is the third tooth from the fourth tooth 4504.

Accordingly, the conducting wire 47 does not define a coil at the seventh tooth 4507, and a portion of the conducting wire 47 as one of the alternately arranged portions 474 is arranged at the eighth tooth 4508, which is next to the seventh tooth 4507. Thereafter, the conducting wire 47 is wound around the tenth tooth 4510, which is the sixth tooth from the fourth tooth 4504, to define one of the U-phase coil portions 42U. Then, one of the alternately arranged portions 474 is arranged to extend from the tenth tooth 4510 over the eleventh tooth 4511 and the twelfth tooth 4512. Then, the alternately arranged portion 474 is arranged to extend axially downward through a slot between the twelfth tooth 4512 and the first tooth 4501.

Then, the conducting wire 47 is arranged to extend on the axially lower side of the first tooth 4501 and the second tooth 4502. A portion of the conducting wire 47 is arranged to extend on the same axial side of the first tooth 4501 and the second tooth 4502, i.e., adjacent ones of the teeth 45, and this portion of the conducting wire 47 is the passage line portion 475.

Figure 6:
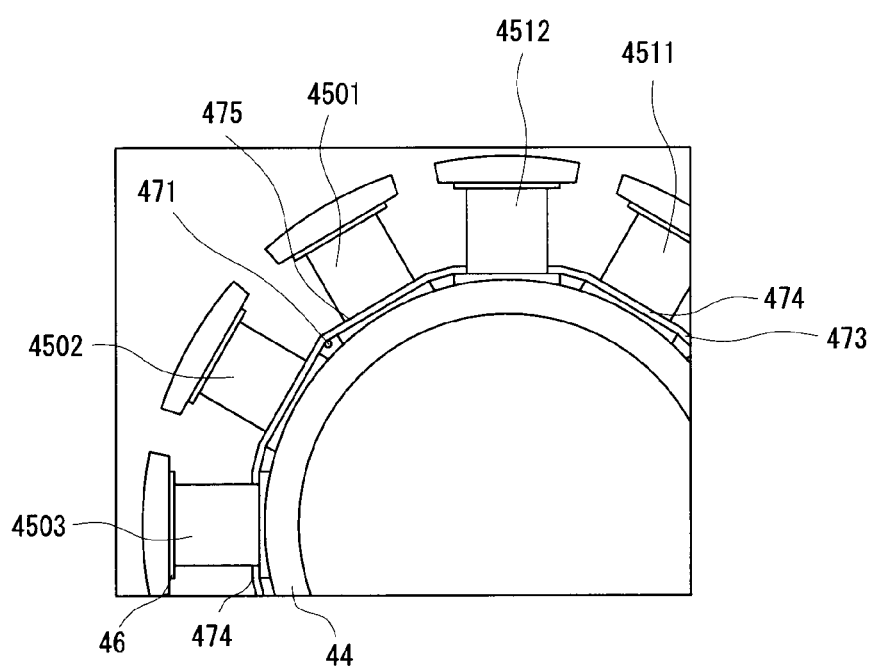
FIG. 6 is a diagram illustrating a passage line portion in an enlarged form.

FIG. 6 is a diagram illustrating the passage line portion 475 in an enlarged form. FIG. 6 is a bottom view. Unlike the alternately arranged portions 474, the passage line portion 475 is arranged to extend on the same axial side over two adjacent ones of the teeth 45. Accordingly, if the passage line portion 475 is arranged to extend in a straight line with tension applied thereto, the passage line portion 475 may be arranged radially inward of the core back 44. Therefore, the passage line portion 475 is arranged with some looseness. When the passage line portion 475 is arranged with some looseness, the passage line portion 475 may become so loose as to overlap with the core back 44 when viewed in the axial direction, resulting in poor workability. In addition, when the passage line portion 475 is arranged with some looseness, tension of portions of the conducting wire 47 adjacent to the passage line portion 475 may be reduced, resulting in a looseness of the entire conducting wire 47.

Accordingly, in the armature 4 of the motor A, the passage line portion 475 is arranged to extend on the same axial side over two of the teeth 45 which have the incoming portion 471 arranged circumferentially therebetween, i.e., the first tooth 4501 and the second tooth 4502. As a result, the passage line portion 475 is arranged to cross the incoming portion 471. In addition, the passage line portion 475 is arranged radially outside of the incoming portion 471. Note that the passage line portion 475 may be arranged radially outside of the outgoing portion 472. That is, the passage line portion 475 is arranged to extend on the same axial side over the two teeth 4501 and 4502 which have at least one of the incoming portion 471 and the outgoing portion 472 arranged circumferentially therebetween, and is arranged radially outside of at least one of the incoming portion 471 and the outgoing portion 472.

The above arrangement reduces the likelihood that the passage line portion 475 will go radially inward to an excessive degree when the passage line portion 475 is arranged with some tension applied thereto. This contributes to preventing the passage line portion 475 from overlapping with the core back 44 when viewed in the axial direction. This in turn reduces the likelihood that the passage line portion 475, that is, a portion of the conducting wire 47, will interfere with another member when the armature 4 is attached to the stator holding portion 13. This contributes to preventing the conducting wire 47 from being damaged or deteriorated.

In addition, the passage line portion 475 is arranged on the axially lower side of the first tooth 4501 and the second tooth 4502. The passage line portion 475 is arranged at a boundary between the first and second rounds of the circumferentially extending portions 473. That is, the passage line portion 475 is arranged to extend on the same axial side over the tooth 4501 at an end of the first round of the arrangement of the circumferentially extending portions 473 and the tooth 4502 at a start of the second round of the arrangement of the circumferentially extending portions 473, and the passage line portion 475 is arranged radially outside of the incoming portion 471.

Then, the second round of the circumferentially extending portions 473 also has the alternately arranged portions 474 each of which is arranged to extend alternately on the axially upper and lower sides of adjacent ones of the teeth 45. Provision of the passage line portion 475 causes the alternately arranged portions 474 arranged in the second round to be arranged on an opposite axial side of the teeth 45 with respect to the alternately arranged portions 474 arranged in the first round. For example, one of the alternately arranged portions 474 is arranged to extend on the axially lower side of the third tooth 4503 in the first round, while one of the alternately arranged portions 474 is arranged to extend on the axially upper side of the third tooth 4503 in the second round.

Then, the conducting wire 47 is wound around the seventh tooth 4507, which is the third tooth from the fourth tooth 4504, around which one of the U-phase coil portions 42U has been defined in the first round of the arrangement of the circumferentially extending portions 473. Notice that one of the alternately arranged portions 474 is arranged to extend on the axially lower side of the sixth tooth 4506 in the second round. Then, the conducting wire 47 is wound in the counterclockwise direction around the seventh tooth 4507 to define one of the U-phase coil portions 42U.

After the conducting wire 47 defines the U-phase coil portion 42U around the seventh tooth 4507, a portion of the conducting wire 47 as one of the alternately arranged portions 474 is arranged to extend from the seventh tooth 4507 to the first tooth 4501, which is the sixth tooth from the seventh tooth 4507. Then, the conducting wire 47 is wound around the first tooth 4501 to define one of the U-phase coil portions 42U. Then, the U-phase coil portion 42U defined around the first tooth 4501 is joined to the outgoing portion 472. The outgoing portion 472 is drawn out axially downward from an axially lower end portion of the stator core 41.

As described above, in the armature 4, the conducting wire 47 includes the incoming portion 471, which is arranged to lead from the first axial side of the stator core 41 to the second axial side thereof, that is, from the lower side to the upper side. Then, the conducting wire 47 is arranged to extend in the circumferential direction along the core back 44 to define the circumferentially extending portions 473. In the circumferentially extending portions 473, the conducting wire 47 is arranged to extend alternately on the axially upper and lower sides of adjacent ones of the teeth 45 to define the alternately arranged portions 474. In addition, the conducting wire 47 is wound in a predetermined direction around the predetermined teeth 45 to define the U-phase coil portions 42U. After all the U-phase coil portions 42U are defined, the conducting wire 47 is drawn out to the first axial side, i.e., the lower side, of the stator core 41.

The conducting wire 47 is wound around the stator core 41, which includes an even number of teeth 45, and the conducting wire 47 includes the alternately arranged portions 474. In this case, one to two rounds of the circumferentially extending portions 473 are arranged along the core back 44. In addition, the number of coil portions 42U joined to the circumferentially extending portions 473 arranged in the first round is equal to the number of coil portions 42U joined to the circumferentially extending portions 473 arranged in the second round. Further, the conducting wire 47 includes the passage line portion 475, which is arranged to extend on the same axial side of circumferentially adjacent ones of the teeth 45, at the boundary between the first and second rounds of the circumferentially extending portions 473. A combination of two rounds of the alternately arranged portions 474 along the core back 44 and the provision of the passage line portion 475 at the boundary between the first and second rounds makes it possible to define all the U-phase coil portions 42U by winding the conducting wire 47 in the same direction when viewed from radially outside. In addition, since the number of U-phase coil portions 42U defined in the first round and the number of U-phase coil portions 42U defined in the second round are equal to each other, even balance between the coil portions is achieved, which contributes to preventing a variation in motor characteristics.

In addition, the provision of the alternately arranged portions 474 causes portions of the conducting wire 47 to be arranged on both the first and second axial sides of each of the teeth 45. With this arrangement of the conducting wire 47, portions of the conducting wire 47 which are arranged on the axially upper and lower sides of each of the teeth 45 around which no U-phase coil portion 42U is defined cancel a magnetic force when an electric current passes through the conducting wire 47. This contributes to maintaining magnetic flux around the stator core 41 in good balance.

Note that each of the V-phase conducting wire and the W-phase conducting wire can be arranged in the same manner as the U-phase conducting wire except that the positions of the incoming portion and the outgoing portion are different. With each of the V-phase conducting wire and the W-phase conducting wire being arranged in the same manner as the U-phase conducting wire, the magnetic flux around the stator core 41 can be maintained in good balance even when an electric current passes through each of the V-phase conducting wire and the W-phase conducting wire, and a reduction in the likelihood of a ripple, a vibration, or the like of the motor A can be achieved.

In addition, arranging the incoming portion 471 radially inside of the passage line portion 475 contributes to preventing the passage line portion 475 from moving toward the core back 44. This allows the conducting wire 47 to be arranged around the stator core 41 with high tension being applied to the conducting wire 47. This in turn contributes to preventing the passage line portion 475 from becoming loose, and preventing the passage line portion 475 from interfering with the core back 44. In addition, arranging the conducting wire 47 with high tension being applied thereto contributes to preventing each coil from becoming loose. This leads to increased efficiency of the motor.

The configuration of the armature 4 in which the passage line portion 475 crosses the incoming portion 471, and is arranged radially outside of the incoming portion 471 is particularly effective for an armature 4 in which the strength of the passage line portion 475 is low, that is, in which the conducting wire 47 is thin (for example, 0.2 mm to 0.25 mm in diameter). The above configuration is particularly effective, for example, when the outside diameter of the conducting wire 47 is ⅕ or less of the radial dimension of each of the teeth 45.

Figure 7:
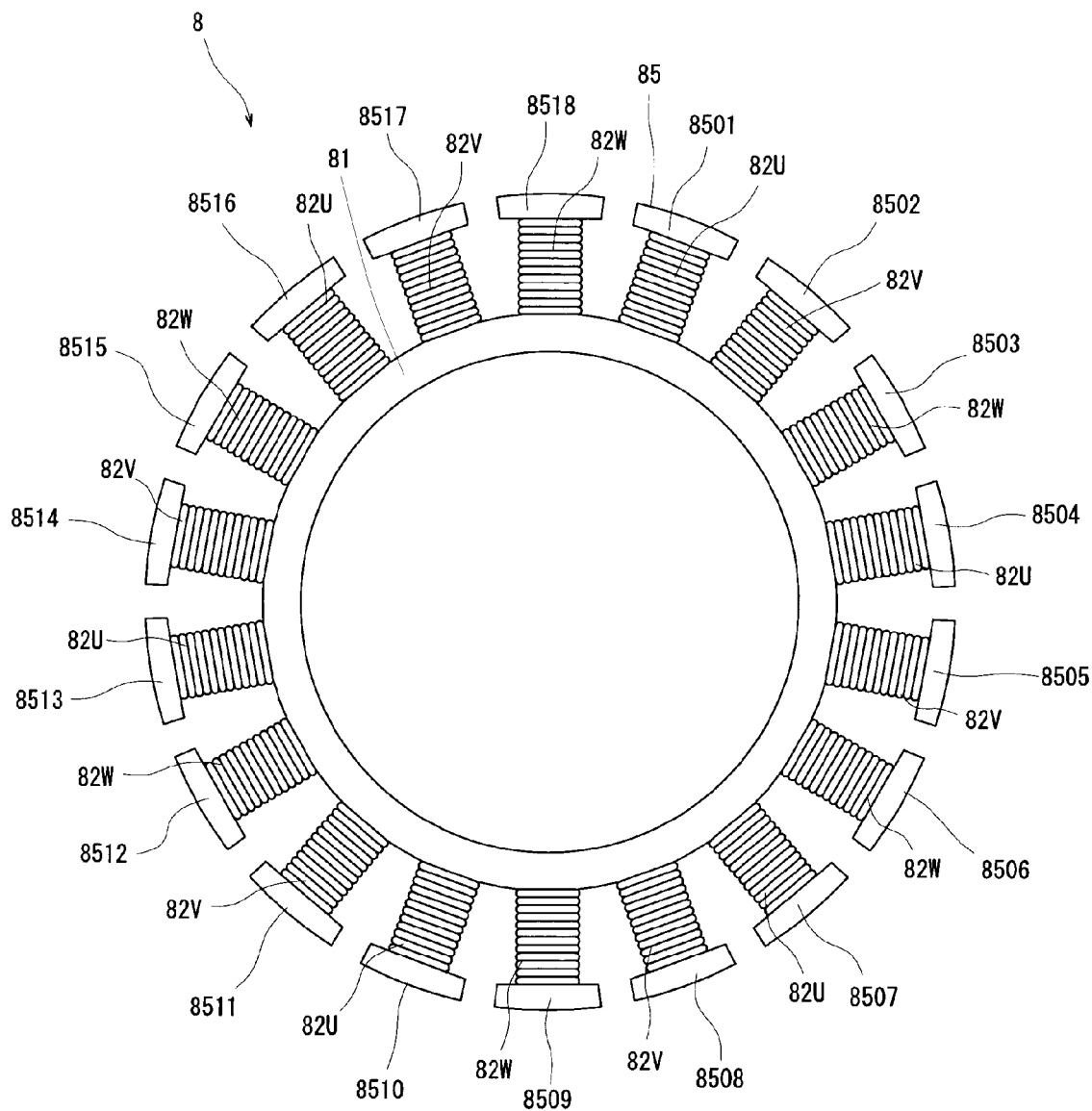
FIG. 7 is a plan view of an armature used in a motor according to another preferred embodiment of the present invention.
Figure 8:
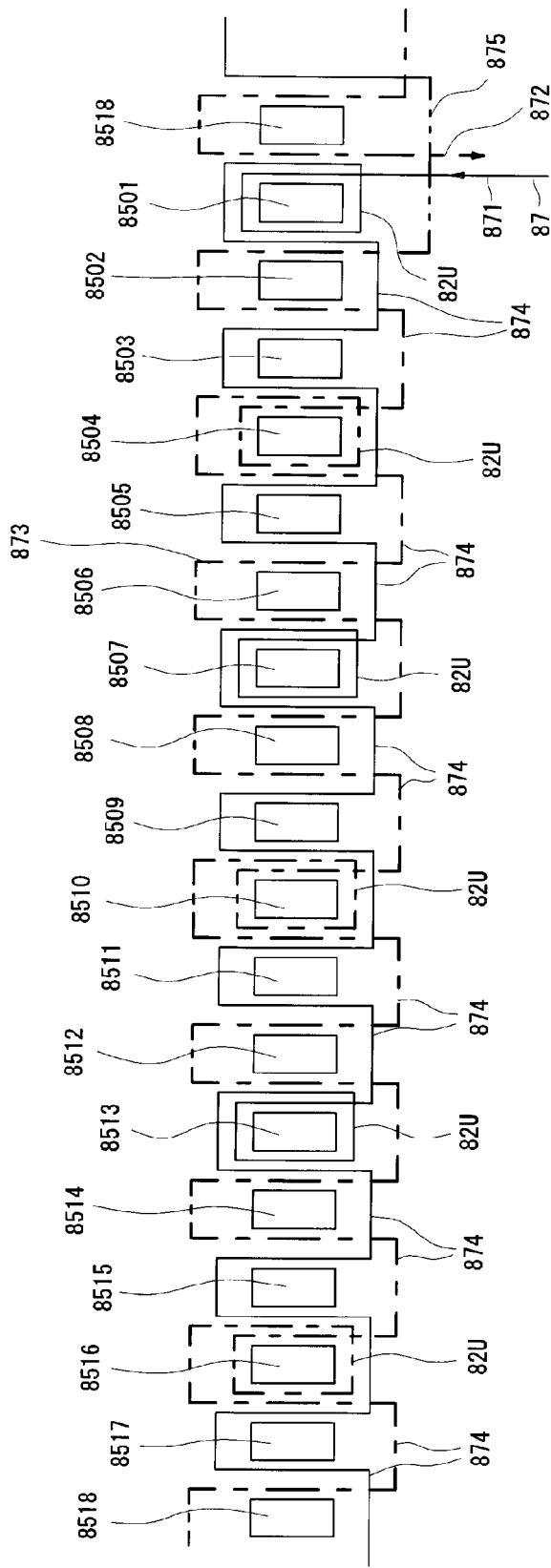
FIG. 8 is a wiring diagram illustrating how a conducting wire including U-phase coil portions is arranged.

A motor according to a second preferred embodiment of the present invention will now be described below with reference to the accompanying drawings. FIG. 7 is a plan view of an armature 8 used in the motor according to the second preferred embodiment of the present invention. FIG. 8 is a wiring diagram illustrating how a conducting wire 87 including U-phase coil portions 82U is arranged. Note that, in each of FIGS. 7 and 8, a first round of circumferentially extending portions 873 is represented by a solid line. In addition, a second round of circumferentially extending portions 873 is represented by a dot-dashed line thicker than the solid line for the first round. Further, a passage line portion 875 is represented by a chain double-dashed line. In addition, in FIG. 8, each U-phase coil portion 82U is indicated by a line making one round around a corresponding tooth 85.

Referring to FIG. 7, the armature 8 of the motor according to the present preferred embodiment includes eighteen teeth 85. That is, the armature 8 has eighteen slots. The number of poles of the motor may be, for example, twelve although this is not illustrated in the figures. That is, a motor having twelve poles and eighteen slots can be used as the motor according to the present preferred embodiment. Although the arrangement of a U-phase conducting wire, which defines the U-phase coil portions 82U, is illustrated, each of a V-phase conducting wire and a W-phase conducting wire is arranged in the same manner as the U-phase conducting wire in the present preferred embodiment as in the first preferred embodiment.

Referring to FIG. 7, the armature 8 includes first to eighteenth teeth 8501 to 8518. In the armature 8, the conducting wire 87 is wound around the first tooth 8501, the fourth tooth 8504, the seventh tooth 8507, the tenth tooth 8510, the thirteenth tooth 8513, and the sixteenth tooth 8516 to define the U-phase coil portions 82U.

In addition, an incoming portion 871 is arranged in a slot between the eighteenth tooth 8518 and the first tooth 8501. Then, the conducting wire 87 is wound around the first tooth 8501 to define one of the U-phase coil portions 82U. Then, one of the circumferentially extending portions 873 is arranged in the circumferential direction. That is, an alternately arranged portion 874 is arranged in the circumferential direction. Then, the U-phase coil portion 82U is wound around every sixth tooth 85, that is, the seventh tooth 8507 and the thirteenth tooth 8513. Then, the first round of the arrangement of the circumferentially extending portions 873 is finished. That is, the coil portions 82U joined to the circumferentially extending portions 873 arranged in the first round are arranged at regular intervals in the circumferential direction.

Then, after the first round of the wiring for a core back 84 is finished, the passage line portion 875 is arranged to extend over the eighteenth tooth 8518 and the first tooth 8501.

Then, the second round is started, and the conducting wire 87 is wound around the tooth 85 (here, the fourth tooth 8504) which is the third tooth from one of the teeth 85 around which the U-phase coil portions 82U have been defined in the first round to define one of the U-phase coil portions 82U. Then, alternately arranged portions 874 are arranged to define one of the U-phase coil portions 82U around every sixth tooth 85. That is, the coil portions 82U joined to the circumferentially extending portions 873 arranged in the second round are arranged at regular intervals in the circumferential direction.

Then, after the U-phase coil portion 82U is defined around the last tooth 85 (here, the sixteenth tooth 8516), an alternately arranged portion 874 is further arranged, and an outgoing portion 872 is arranged in the slot between the eighteenth tooth 8518 and the first tooth 8501.

Even in the case of the armature 8 having eighteen slots, portions of the conducting wire 87 can be arranged on both the axially upper and lower sides of each of the teeth 85, which contributes to maintaining magnetic flux in good balance. That is, the coil portions 82U joined to the circumferentially extending portions 873 arranged in the first round and the coil portions 82U joined to the circumferentially extending portions 873 arranged in the second round put together are arranged at regular intervals in the circumferential direction.

Note that each of the V-phase conducting wire and the W-phase conducting wire can be arranged in the same manner as the U-phase conducting wire except that the circumferential positions of the incoming portion and the outgoing portion are different. With each of the V-phase conducting wire and the W-phase conducting wire being arranged in the same manner as the U-phase conducting wire, the magnetic flux around a stator core 81 can be maintained in good balance even when an electric current passes through each of the V-phase conducting wire and the W-phase conducting wire, and a reduction in the likelihood of a ripple, a vibration, or the like of the motor A can be achieved.

The second preferred embodiment is similar to the first preferred embodiment in other features.

Although the incoming portion and the outgoing portion are arranged in the same slot in each of the above-described preferred embodiments, this is not essential to the present invention. For example, in a modification of the armature 8 according to the second preferred embodiment, after a coil portion 82 is defined around the last tooth 85, i.e., the sixteenth tooth 8516, a portion of the conducting wire 87 as the outgoing portion 872 may be immediately drawn out to the axially lower side of the stator core 81 without an arrangement of the alternately arranged portion 874. In this modification, the conducting wire 87 is arranged on only one axial side of some of the teeth 85 (here, the seventeenth tooth 8517 and the eighteenth tooth 8518). This arrangement is able to reduce the length of the conducting wire 87.

Although the passage line portion is arranged at such a position as to cross the incoming portion in each of the above-described preferred embodiments, this is not essential to the present invention. For example, in the case where the incoming portion and the outgoing portion are arranged in different slots as in the third preferred embodiment, the passage line portion may be arranged at such a position as to cross the outgoing portion. Note that the passage line portion is arranged after all the coil portions to be defined in the first round are wound.

While the arrangement of the conducting wires of the stator used in an outer-rotor brushless DC motor has been described in the above description of each of the above-described preferred embodiments, preferred embodiments of the present invention are applicable to not only outer-rotor motors but also inner-rotor motors.

Note that, although the armatures 4 and 8 according to the above-described first and second preferred embodiments have twelve and eighteen slots, respectively, this is not essential to the present invention. Preferred embodiments of the present invention are widely applicable to three-phase motors including a stator having an even number of slots. An armature used in a three-phase motor and having an even number of slots can be said to include 6S teeth (where S is a positive integer). That is, the structure of an armature according to a preferred embodiment of the present invention is applicable when a stator core including 6S teeth is used. That is, the armature 4 (8) includes 6S teeth 45 (85) (where S is a positive integer).

In each of the above-described preferred embodiments, the conducting wire is wound around the predetermined teeth to define the coils while the conducting wire makes two rounds along the core back of the armature. At this time, in the first round, the conducting wire is wound around every sixth tooth from the tooth around which a first coil is defined to define the coils. Then, the passage line portion is defined at the boundary between the first and second rounds. In the second round, a coil is wound around the third tooth from the tooth around which the first coil has been defined in the first round, and the conducting wire is wound around every sixth tooth from this tooth to define the coils.

While preferred embodiments of the present invention have been described above, it will be understood that the preferred embodiments may be modified in various manners without departing from the scope and spirit of the present invention.

Preferred embodiments of the present invention are applicable to, for example, motors arranged to drive storage apparatuses, such as hard disk apparatuses, optical disk apparatuses, and the like.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A three-phase motor comprising:
a rotor rotatable about a central axis extending in a vertical direction; and
a stator radially opposite to the rotor; wherein
the stator includes:
an armature; and
a base that holds the armature;
the armature includes:
an annular core back extending in an axial direction;
6S teeth extending radially from the core back and in a circumferential direction where S is a positive integer; and
conducting wires for three phases;
each of the conducting wires for three phases includes:
an incoming portion leading from a first axial side into the armature;
a plurality of coil portions each of which is wound around a corresponding one of the teeth;

an outgoing portion leading from a second axial side to the first axial side to be drawn out of the armature; and circumferentially extending portions each of which extends in the circumferential direction along the core back to join the incoming portion to one of the coil portions, to join one of the coil portions to another one of the coil portions, or to join one of the coil portions to the outgoing portion;

the circumferentially extending portions include:

an alternately arranged portion extending alternately on the first and second axial sides of circumferentially adjacent ones of the teeth; and a passage line portion extending on a same axial side of circumferentially adjacent ones of the teeth;

one to two rounds of the circumferentially extending portions are located along the core back; and the passage line portion extends on the same axial side over two of the teeth which have at least one of the incoming portion and the outgoing portion located circumferentially therebetween, and is radially outside of at least one of the incoming portion and the outgoing portion.

2. The motor according to claim 1, wherein the passage line portion extends on the same axial side over the tooth at an end of a first round of the circumferentially extending portions and the tooth at a start of a second round of the circumferentially extending portions; and the passage line portion is radially outside of the incoming portion.

3. The motor according to claim 1, wherein a number of coil portions joined to the circumferentially extending portions in the first round is equal to a number of coil portions joined to the circumferentially extending portions in the second round.

4. The motor according to claim 1, wherein the coil portions joined to the circumferentially extending portions in the first round are located at regular intervals in the circumferential direction.

5. The motor according to claim 1, wherein the coil portions joined to the circumferentially extending portions in the second round are located at regular intervals in the circumferential direction.

6. The motor according to claim 1, wherein the coil portions joined to the circumferentially extending portions in the first round and the coil portions joined to the circumferentially extending portions in the second round together are located at regular intervals in the circumferential direction.

7. The motor according to claim 1, wherein the teeth project radially outward from the core back.

* * * * *